United States Patent
Zimm et al.

(10) Patent No.: US 6,526,759 B2
(45) Date of Patent: Mar. 4, 2003

(54) ROTATING BED MAGNETIC REFRIGERATION APPARATUS

(75) Inventors: Carl B. Zimm, Madison, WI (US); Alexander Sternberg, Madison, WI (US); Alexander G. Jastrab, Cambridge, WI (US); Andre M. Boeder, Monona, WI (US); Lewis M. Lawton, Barrington, IL (US); Jeremy Jonathan Chell, Madison, WI (US)

(73) Assignee: Astronautics Corporation of America, Milwaukee, WI (US)

( * ) Notice: Subject to any disclaimer, the term of this patent is extended or adjusted under 35 U.S.C. 154(b) by 0 days.

(21) Appl. No.: 09/925,032

(22) Filed: Aug. 8, 2001

(65) Prior Publication Data

US 2002/0053209 A1 May 9, 2002

Related U.S. Application Data

(60) Provisional application No. 60/223,940, filed on Aug. 9, 2000.

(51) Int. Cl.[7] .................................. F25B 21/02
(52) U.S. Cl. ................................. 62/3.1; 62/6
(58) Field of Search ......................... 62/3.1, 6

(56) References Cited

U.S. PATENT DOCUMENTS

| | | |
|---|---|---|
| 4,107,935 A | 8/1978 | Steyert, Jr. |
| 4,332,135 A | 6/1982 | Barclay et al. |
| 4,408,463 A | 10/1983 | Barclay |
| 4,441,325 A | 4/1984 | Bon-Mardion et al. |
| 4,459,811 A | 7/1984 | Barclay et al. |
| 4,507,927 A | 4/1985 | Barclay |
| 4,507,928 A | 4/1985 | Johnson |
| 4,625,519 A | 12/1986 | Hakaraku et al. |
| 4,702,090 A | 10/1987 | Barclay et al. |
| 4,704,871 A | 11/1987 | Barclay et al. |
| 4,727,721 A | 3/1988 | Peschka et al. |
| 4,727,722 A | 3/1988 | Kirol |
| 5,091,361 A | 2/1992 | Hed |
| 5,182,914 A | 2/1993 | Barclay et al. |
| 5,249,424 A | 10/1993 | DeGregoria et al. |
| 5,332,029 A | 7/1994 | Tokai et al. |
| 5,381,664 A | 1/1995 | Bennett et al. |
| 5,444,983 A | 8/1995 | Howard |
| 5,447,034 A | 9/1995 | Kuriyama et al. |
| 5,743,095 A | 4/1998 | Gschneidner, Jr. et al. |
| 5,934,078 A | 8/1999 | Lawton, Jr. et al. |

OTHER PUBLICATIONS

K.A. Gschneidner, Jr., "Magnetic Refrigeration," in Rare Earths: Science, Technology and Applications III, The Minerals, Metals and Materials Society, 1997, pp. 209–221.

(List continued on next page.)

Primary Examiner—Ronald Capossela
(74) Attorney, Agent, or Firm—Foley & Lardner (57) ABSTRACT

A rotating magnetic refrigeration apparatus has magnetic regenerator beds arranged in a ring that is mounted for rotation about a central axis, such that each bed moves into and out of a magnetic field provided by a magnet as the ring rotates. Heat transfer fluid is directed to and from the regenerator beds by a distribution valve which is connected by conduits to the hot and cold ends of the beds and which rotates with the ring of beds. The distribution valve has a stationary valve member which is connected by conduits to a hot heat exchanger and to a cold heat exchanger. The beds include magnetocaloric material that is porous and that allows heat transfer fluid to flow therethrough. The distribution valve directs heat transfer fluid to the hot end of a bed that is outside of the magnetic field which flows therethrough to the cold end where it is directed back to the distribution valve and, when a bed is in the magnetic field, the distribution valve directs fluid to the cold end of the bed for flow therethrough to the hot end, where the fluid is directed back to the distribution valve, completing an active magnetic regenerator cycle. The fluid flowing through each conduit flows only in a single direction or remains stationary, minimizing dead volume in the conduits.

23 Claims, 10 Drawing Sheets

OTHER PUBLICATIONS

A.J. DeGregoria, et al., "Test Results of an Active Magnetic Regenerative Refrigerator," Advances in Cryogenic Engineering, vol. 37B, 1991, and Cryogenic Engineering Conf., 1991, Jun. 11–14, 1991, Huntsville, Alabama.

A.J. DeGregoria, et al., "Modeling the Active Magnetic Regenerator," Advances in Cryogenic Engineering, vol. 37B, 1991, and Cryogenic Engineering Conf., 1991, Jun. 11–14, 1991, Huntsville, Alabama.

C.R. Cross, et al., "Optimal Temperature–Entropy Curves for Magnetic Refrigeration," Advances in Cryogenic Engineering, vol. 33, pp. 767–776, 1988, and Cryogenic Engineering Conference, Jun., 1987.

L.D. Kirol, et al., "Rotary Recuperative Magnetic Heat Pump," in Advances in Cryogenic Engineering, 1988.

"The Big Chill . . . Magnetic Refrigeration Technology Makes a Cool Debut," the "Insider," Ames Laboratory, Department of Energy, Ames, Iowa, Feb., 1997.

"New Fridge Technology on the Horizon," The Capital Times, Feb. 21, 1997.

ROTATING BED MAGNETIC REFRIGERATION APPARATUS

CROSS-REFERENCE TO RELATED APPLICATION

This application claims the benefit of provisional patent application no. 60/223,940, filed Aug. 9, 2000, the disclosure of which is incorporated by reference.

FIELD OF THE INVENTION

This invention pertains generally to the field of magnetic refrigeration and to active magnetic regenerative refrigeration apparatus.

BACKGROUND OF THE INVENTION

Active magnetic regeneration combines a regenerator with a device which operates on the magnetocaloric effect. The operation of active magnetic regenerators is described in U.S. Pat. No. 4,332,135 to Barclay, et al. An experimental model of an active magnetic regenerator has been built and tested and is described in an article by A. J. DeGregoria, et al., "Test Results of An Active Magnetic Regenerative Refrigerator," Advances in Cryogenic Engineering, Vol. 37B, 1991. A detailed model of the active magnetic regenerator is given in an article by A. J. DeGregoria, Advances in Cryogenic Engineering, Vol. 37B, 1991. An active magnetic regenerator is a type of cooler or heat pump that utilizes the magnetocaloric effect. Materials that exhibit the magnetocaloric effect warm upon magnetization and cool upon demagnetization. In a basic active magnetic regenerator (AMR) device, a bed of magnetocaloric material which is porous to a heat transfer fluid is connected to two heat exchangers, with a mechanism provided for effecting reciprocating fluid flow through the bed of magnetocaloric material from one heat exchanger to the other. A mechanism is also provided for magnetizing and demagnetizing the bed. There are four parts to an AMR cycle: bed magnetization, which warms the magnetocaloric material and the fluid in the bed by the magnetocaloric effect; cold side to hot side fluid flow through the bed with release of heat through a hot side heat exchanger; bed demagnetization, cooling the magnetocaloric material and the fluid in the bed; and hot side to cold side fluid flow through the bed, with the cooled fluid absorbing heat at the cold side heat exchanger.

An AMR device magnetizes and warms the bed prior to fluid flow from cold to hot, and then demagnetizes and cools the bed prior to flow from the hot side to the cold side. The application of the magnetic field to the magnetized bed creates a pair of profiles of temperature and relative position in the bed, one when the bed is magnetized and the other when the bed is demagnetized. The difference between the two bed profiles at any location is the adiabatic temperature change of the magnetocaloric material in going through the change in magnetic field. If the adiabatic temperature change is large enough, the fluid emerging from the cold side of the bed can have a temperature which is lower than the temperature of the cold reservoir, resulting in net cooling of the cold reservoir, rather than a heat leak from the hot reservoir to the cold reservoir which would be the case with an ordinary regenerator. Of course, in accordance with the laws of thermodynamics, work must be done in such a process since heat is flowing from a cold to a hot reservoir. In the case of an AMR, the work is performed by the drive mechanism which moves the magnet and/or the bed relative to one another or by an electrically switched magnet. By utilizing the heat exchangers at both the hot side and the cold side, heat can be removed from the cold side heat exchanger through the AMR and released through the hot side heat exchanger. A structure for accomplishing this transfer is disclosed in the aforesaid U.S. Pat. No. 4,332,135.

A further extension of active magnetic regenerators is shown in U.S. Pat. No. 5,249,424 to DeGregoria, et al., in which the flow of heat transfer fluid through the bed is unbalanced so that more fluid flows through the bed from the hot side to the cold side of the bed than from the cold side to the hot side. The excess heat transfer fluid is diverted back to the hot side of the bed, and multiple stages of active magnetic regenerators may be used. As described in this patent, the regenerator beds may be moved in and out of the magnetic field either in a reciprocating fashion or the beds may be mounted in a rotating wheel.

One of the disadvantages of active magnetic regenerators is the inefficiency encountered because the heat transfer fluid in reciprocating active magnetic regenerators is shuttled back and forth between the regenerator bed(s) and the respective hot and cold heat exchangers. Because the flow of fluid is not in a single direction between the beds and the heat exchangers, some amount of the heat transfer fluid is always in the connecting lines between the beds and the heat exchangers and never cycles both through the beds and the heat exchangers. This trapped heat transfer fluid, commonly referred to as the "dead volume," is a significant source of inefficiency in previous active magnetic regenerators. U.S. Pat. No. 5,934,078 to Lawton, Jr., et al. discloses a reciprocating active magnetic regenerator refrigeration apparatus that greatly reduces the dead volume of heat transfer fluid.

SUMMARY OF THE INVENTION

In accordance with the present invention, a rotating bed magnetic refrigeration apparatus has magnetic regenerator beds arranged in a ring that is mounted for rotation about a central axis, such that each bed moves into and out of a magnetic field provided by a magnet as the ring rotates. Each bed has a hot end and a cold end. Heat transfer fluid is directed to and from the regenerator beds by a distribution valve which is connected by conduits to the hot and cold ends of the beds and which rotates with the ring of beds. The distribution valve has a stationary valve member which is connected by conduits to a hot heat exchanger and to a cold heat exchanger. A pump connected in the conduits drives the heat transfer fluid in circulation via the conduits through the hot and cold heat exchangers, the distribution valve and the magnetic regenerator beds. Each of the beds includes magnetocaloric material that is porous and that allows the heat transfer fluid to flow therethrough. The distribution valve directs heat transfer fluid to the hot end of a bed that is outside of the magnetic field such that the heat transfer fluid flows circumferentially through the bed to its cold end where it is directed back to the distribution valve. When a bed is in the magnetic field, the distribution valve directs fluid to the cold end of the bed for flow therethrough circumferentially to the hot end, where the fluid is directed back to the distribution valve, completing an active magnetic regenerator cycle. During each complete revolution of the ring of regenerator beds, the fluid flowing through each conduit flows only in a single direction or remains stationary during a portion of the cycle, minimizing dead volume in the conduits and thereby enhancing efficiency.

A distribution valve may be utilized that comprises an inner stationary valve member and an outer rotating valve member that is mounted to rotate about a central axis in engagement with the stationary valve member. In a preferred rotary distribution valve, the stationary valve member has two cold fluid chambers and two hot fluid chambers, and the rotating valve member has first cold fluid ports therein that, as the rotating valve member rotates, are successively in communication with the first cold fluid chamber, and second cold fluid ports therein that, as the rotating valve member rotates, are successively in communication with the second cold fluid chamber. The rotating valve member further includes first hot fluid ports that, as the rotating valve member rotates, are successively in communication with the first hot fluid chamber, and second hot fluid ports that, as the rotating valve member rotates, are successively in communication with the second hot fluid chamber. Channels are formed in the stationary valve member extending from two hot fluid openings to the first and second hot fluid chambers, and from two cold fluid openings to the first and second cold fluid chambers. Conduits then extend from cold input ports of the beds at the cold ends thereof to the ports in the rotating valve member that come successively in communication with the first of the cold fluid chambers. Conduits also extend from the cold output ports of the beds to the ports in the rotating valve member that come successively in communication with the second of the cold fluid chambers. Conduits also extend from the hot output ports of the beds at the hot ends of the beds to the ports in the rotating valve member that come successively in communication with the first of the hot fluid chambers as well as conduits that extend from the hot input ports of the beds to the ports of the rotating valve member that come successively in communication with the second of the hot fluid chambers. The rotating valve member is connected by the conduits to the beds in the ring of beds and rotates with the ring. Thus, all of the switching of the fluid flow occurs at the central rotary distribution valve rather than at valves engaged with the ring. The seals required for the central rotary distribution valve are efficient and much simpler than seals that would required to engage with the ports at the beds, allowing simplified seal design, reduced wear on the seals, and minimized mechanical losses in the distribution valve.

The distribution valve may also be formed with two disks having flat faces that are tightly engaged to each other. One of the disks is a stationary valve member and the other is a rotating valve member mounted for rotation. The two disks have ports therein that come successively into and out of communication to direct fluid flow to appropriate conduits extending from the rotating disk to the hot end and cold end of each magnetic refrigerator bed. The distribution valve stationary disk is connected by conduits to the hot heat exchanger and cold heat exchanger, and fluid flow is distributed by the distribution valve disks in the same manner as discussed above for the distribution valve having a stationary inner valve member and a rotating outer valve member.

Because the ring can be driven at constant speed in circular motion, greater mechanical efficiency can be obtained than in reciprocating systems. Furthermore, inertial effects can be minimized by reducing the mass of the rotating components. Preferably, the multiple beds forming the ring are arranged with the hot ends of adjacent beds adjacent to one another, and the cold ends of adjacent beds adjacent to one another, to minimize the temperature differences between adjacent beds and therefore minimize thermal leakage between beds. Preferably, the hot ends of adjacent beds are separated by a flow-proof separator. Separators may also be used at the cold ends of adjacent beds but are not necessary, and in a preferred design the cold ends of adjacent beds are open to and in communication with each other.

Further objects, features and advantages of the invention will be apparent from the following detailed description when taken in conjunction with the accompanying drawings.

DETAILED DESCRIPTION OF THE INVENTION

The rotating bed magnetic refrigeration apparatus in accordance with the invention carries out mechanical motion of the moving parts of the apparatus with continuous circular motion, providing excellent mechanical efficiency. Forces on the parts of the apparatus are well balanced, and the net drive force is primarily that necessary to drive the refrigeration process. Regenerative operation is provided by reciprocating flow of heat transfer fluid to beds of magnetocaloric material. Unidirectional flow of heat transfer fluid through the heat exchangers and conduits is obtained, thereby minimizing dead volume effects in the heat exchangers or in the conduits between the active materials and the heat exchangers. The valve may be of a simple design, is exposed to minimal wear, and generates minimal friction load on the machine. Further, inertial effects can be minimized by reducing the mass of the rotating components in the regenerator bed, and thermal leakage is reduced by grouping together beds having similar temperatures and by providing spatial separation between beds at distinctly different temperatures. The invention also provides simultaneous heat transfer fluid flow through multiple regenerator beds.

Figure 1:
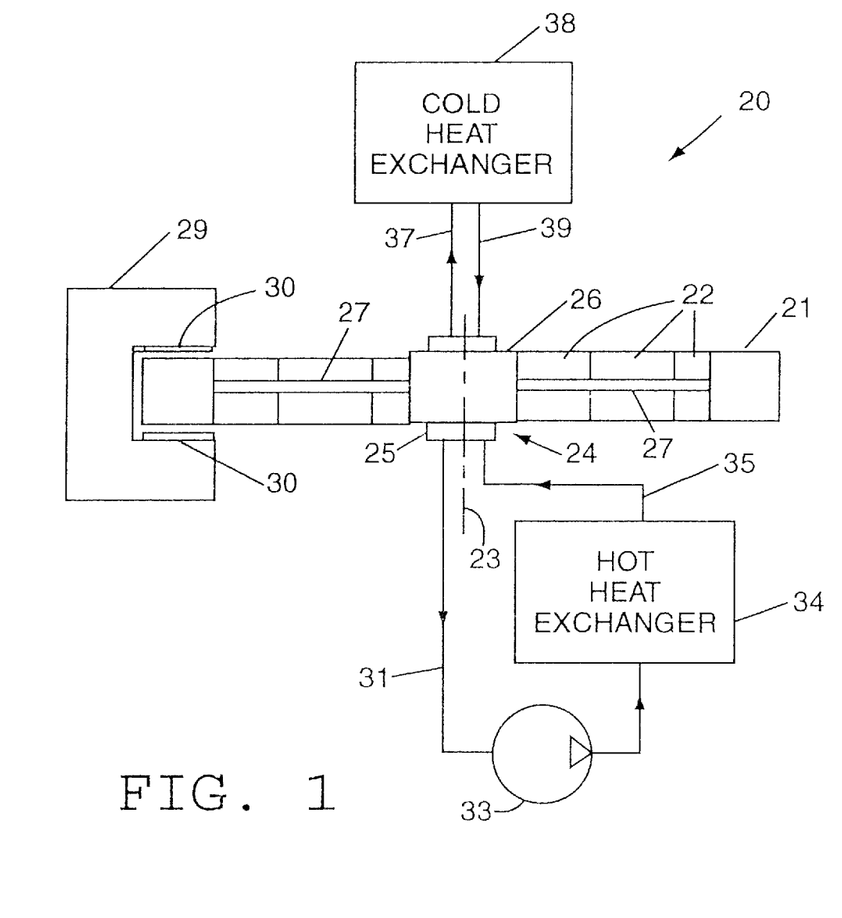
FIG. 1 is a simplified schematic view of the magnetic refrigeration apparatus of the present invention.

For purposes of illustrating the principles of the invention, a rotating bed magnetic refrigerator apparatus in accordance with the invention is shown generally at 20 in FIG. 1 in simplified schematic form. The apparatus 20 includes a circular ring 21 formed of a plurality of regenerator beds 22 each including material which exhibits the magnetocaloric effect and which is porous to allow the flow of heat transfer fluid through the material. The ring 21 is mounted for rotation about a central axis 23. A central distribution valve 24 is positioned at the central axis 23 and includes an inner stationary valve member 25 and an outer rotating valve member 26. A set of rotating conduits 27 for heat transfer fluid extends from the outer valve member 26 to connection to the ring 21 of regenerator beds 22. The set of conduits 27 are shown directly extending from the rotary distribution valve 24 to the ring 21 for illustrative purposes, although it is understood that they may be directed in other manners (as also discussed below), and may or may not be utilized to provide physical support for the ring 21 by which it is mounted for rotation about the axis 23.

A magnet 29 is formed to have a section between end plates 30 at which a magnetic field extends through a portion but not all of the circumference of the ring 21, thus placing some of the individual beds within the ring 21 within the magnetic field of the magnet 29 while other beds 22 are outside of the magnetic field. As the ring 21 rotates about the axis 23, individual beds 22 within the ring 21 will progressively move into, through, and then out of the magnetic field provided by the magnet 29. When the beds 22 are in the magnetic field from the magnet 29, the magnetocaloric material within the beds will increase in temperature, and cooler heat transfer fluid can be passed therethrough to draw heat from the magnetocaloric material. When the beds 22 move out of the magnetic field, they decrease in temperature, and warmer heat transfer fluid can be passed through the beds to draw heat from the heat transfer fluid to the magnetocaloric material of the beds. The beds 22 are preferably arranged so that a thermal gradient is maintained through the porous magnetocaloric material circumferentially through the beds, from a "hot" end to a "cold" end, by flowing the cooler heat transfer fluid from the cold end to the warm end of each bed when the beds are within the magnetic field of the magnet 29, and flowing the warmer heat transfer fluid from the hot end of the bed to the cold end of the bed when the beds are out of the magnetic field of the magnet 29. The conduits 27 are connected from the rotary distribution valve 24 to the hot and cold ends of each bed to allow such flow to occur.

The valve 24 functions to receive the hot heat transfer fluid exiting from one or more beds within the magnetic field through one or more of the conduits in the set 27, and direct the fluid from the stationary valve member 25 on a conduit 31 through a pump 33 to a hot heat exchanger 34 which transfers the heat in the fluid to the ambient air or to another heat sink. The cooled fluid that exits the hot heat exchanger 34 passes on a conduit 35 back to a port in the stationary valve member 25. This fluid is then directed on one or more of the conduits 27 to the hot end of one or more of the beds 22 that are outside of the magnetic field, where the fluid decreases in temperature as it passes through the cooled bed. The cooled fluid is then directed back to the rotating valve member 26 of the valve 24 on the conduits 27, and the cooled fluid exits from the stationary valve member 25 on a conduit 37 to a cold heat exchanger 38 which transfers heat from the volume to be cooled (e.g., the inside of a refrigerator enclosure) to the heat transfer fluid. The warmed heat transfer fluid then exits the cold heat exchanger 38 on a conduit 39 back to the valve 24, which directs it on one or more of the conduits 27 to the cold end of one or more beds 22 that are within the magnetic field imposed by the magnet 29. The warmed fluid exits the hot end of the bed onto one of the conduits 27 which directs the fluid back to the distribution valve 24 from whence it passes on the conduit 31 to the pump 33 to complete the cycle. As the ring 21 rotates, the rotary distribution valve 24 switches the flow to the conduits 27 to maintain the appropriate direction of flow to the regenerator beds 22 as they move in and out of the magnetic field of the magnet 29.

While the diagram of FIG. 1 is simplified for illustration, it may be noted that the conduits in the set of conduits 27 are fixed to the regenerator beds 22 and rotate with the ring 21 of regenerator beds. Thus, it is seen that there is no sliding contact required between the conduits 27 and the regenerator beds at the position of the ring 21. Further, the set of conduits 27 is also fixedly connected to the rotating valve member 26, which rotates with the ring 21. In addition, the flow on the conduits 27 is unidirectional; that is, fluid is either flowing in a single direction in each of the conduits in the set 27 when that conduit is connected to transmit heat transfer fluid through a regenerator bed, or no flow occurs through the conduit 27 so that the heat transfer fluid in the conduit dwells there until the bed to which it is connected reaches a different position. Further, the heat transfer fluid flow through the external conduits 31 and 35, the pump 33, and the hot heat exchanger 34, is in a single direction, and the heat transfer fluid flow through the external conduits 37 and 39 and the cold heat exchanger 38 is also in a single direction, and the fluid flows continuously through these elements. Thus, the dead volume of heat transfer fluid is minimized.

Figure 2:
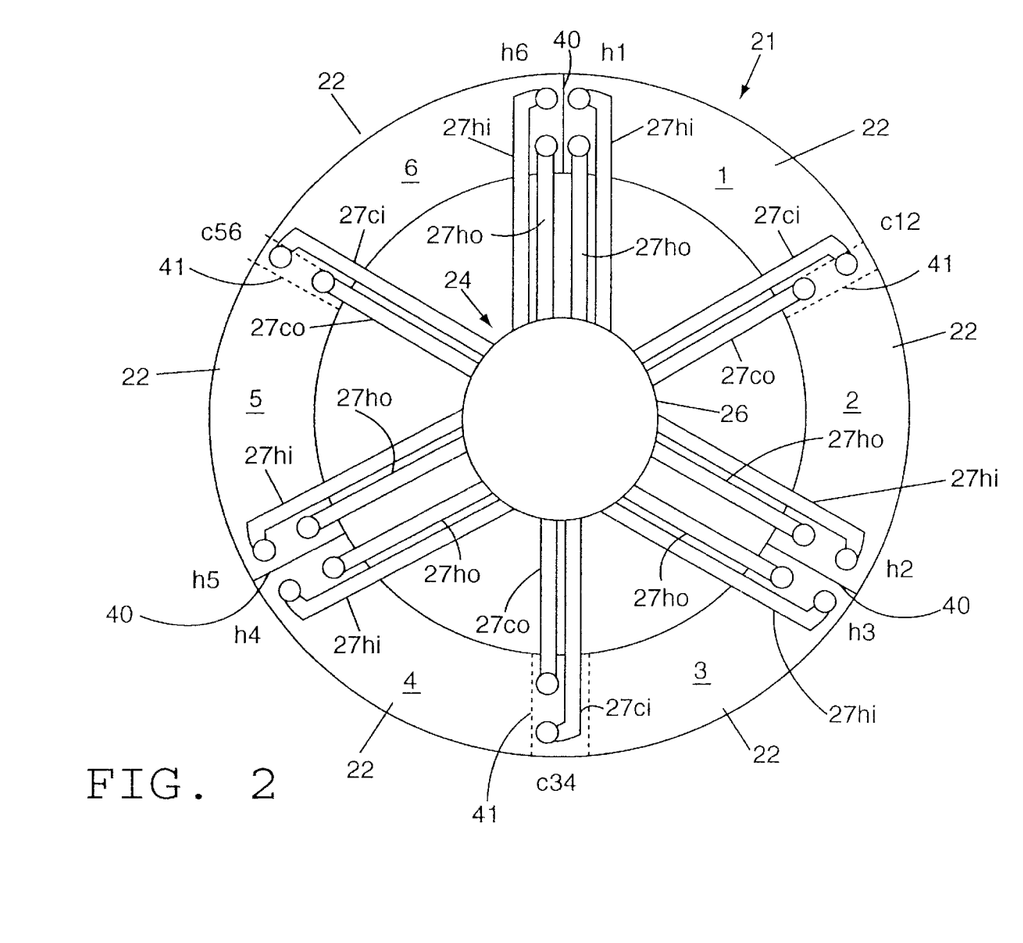
FIG. 2 is a simplified top view of the ring of magnetic regenerator beds in accordance with the invention showing, in simplified form, the arrangement of conduits extending from the distribution valve to the ports at the hot ends and cold ends of the regenerator beds.

FIG. 2 illustrates schematically the way in which the heat transfer conduits 27 may be connected to the hot ends and cold ends of the beds 22. The ring 21 of FIG. 2 includes, for this example, six beds 22, which are labeled 1–6. Other numbers of beds could be utilized with analogous conduit. Each bed has a hot end, designated by the letter "h" and a cold end, designated by the letter "c." As illustrated in FIG. 2, each of the beds 22 has two hot end ports, i.e., the ports h1 for bed 1, h2 for bed 2, h3 for bed 3, h4 for bed 4, h5 for bed 5, and h6 for bed 6. One of the ports serves as a hot end input port and is connected to one of the conduits in the set 27 that is designated 27hi. The other of the ports at the hot end functions as an output port and is connected to one of the conduits designated 27ho in FIG. 2. Preferably, there are an even number of beds with each of the beds 22 having a hot end that is adjacent to the hot end of the adjacent bed. The structural support for the bed ring 21 and the hot section of the valve is best mounted to the hot ends of the beds. The hot ends of each bed are separated by separators 40 so that no heat transfer fluid flows between the adjacent beds at their hot ends. The cold ends of the beds are thus also adjacent to one another, and could have port arrangements similar to that of the sides of the beds. However, the conduit connections can be simplified, as shown in FIG. 2, by having a single input port and a single output port at the position where the cold ends of adjoining beds 22 meet. A single conduit, labeled 27ci, is connected to the input port at the cold ends of adjacent beds, and a conduit, designated 27co in FIG. 2, is connected to the cold end output port at a position between the cold ends of the adjacent beds 22. To allow even distribution of the heat transfer fluid through the beds at the cold ends, a distribution space defined by the dotted lines labeled 41 in FIG. 2 may be formed between the adjacent beds. The structural support for the cold section of the valve is best mounted to the cold ends of the beds.

Conventional fluid handling equipment may be added to the external sections of the fluid loop to improve reliability. For example, a fluid accumulator and a filter may be added to the flow loop after the pump 33 to protect the valve and magnetocaloric beds from pressure spikes and contamination.

Inlet and outlet pairs of conduits 27 emerging from the valve may be joined into a single passage terminating at the bed ring 21. The merger may be done with a Y connector. For example, referring to FIG. 2, inlet and outlet pairs of conduits 27ho, 27hi may be joined by a Y connector and terminate at a single inlet/outlet port at each bed, and similarly for conduits 27co, 27ci. The flow in the passage between the Y connector and the bed is bi-directional, and thus has the disadvantage of becoming flow dead volume. However, combined inlet/outlet ports on the bed have the advantages of taking up less space, are less susceptible to clogging and may have less heat leak.

Figure 3:
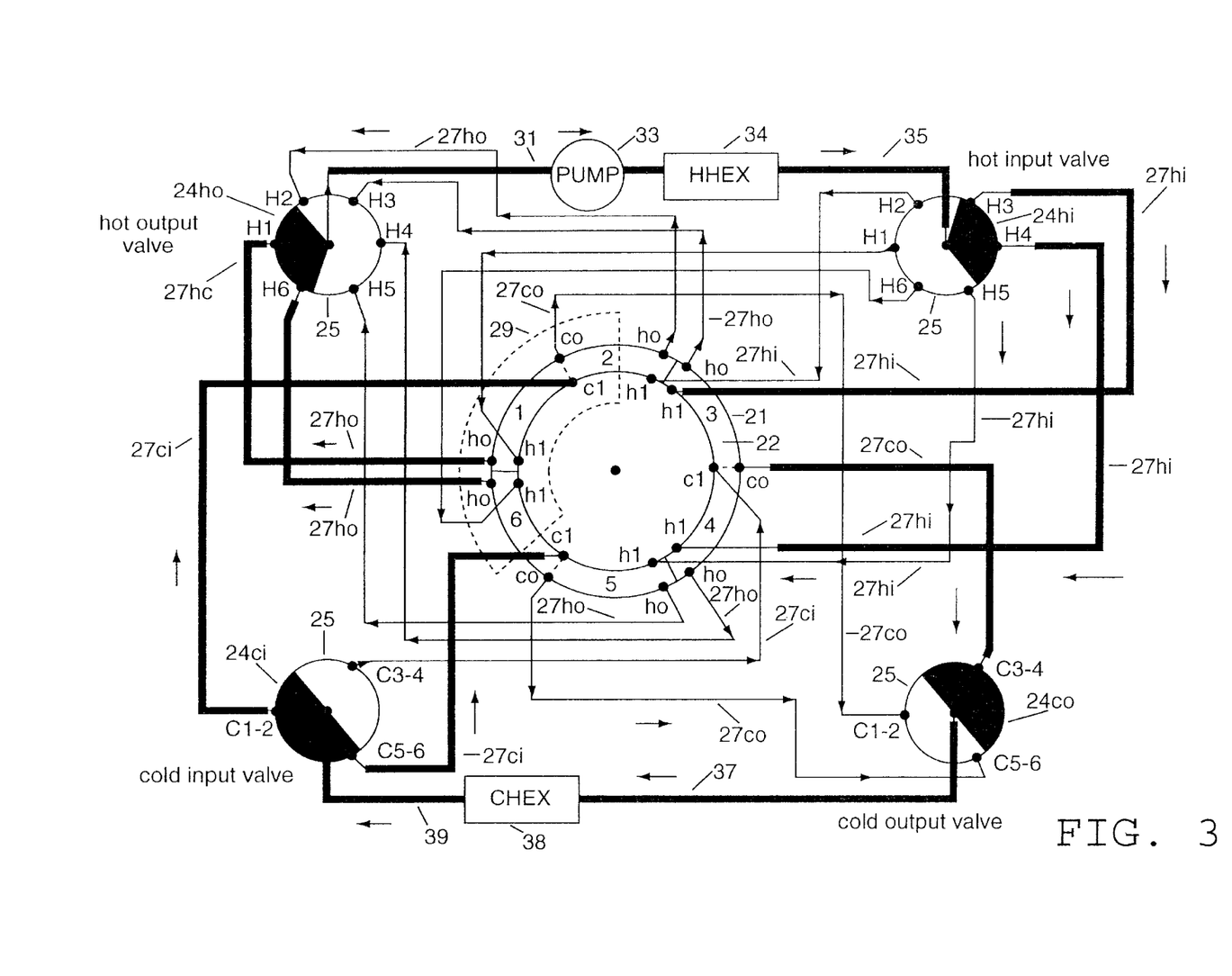
FIG. 3 is a schematic view illustrating the pattern of heat transfer fluid flow through the components of the apparatus in a first position of the ring of regenerator beds.
Figure 4:
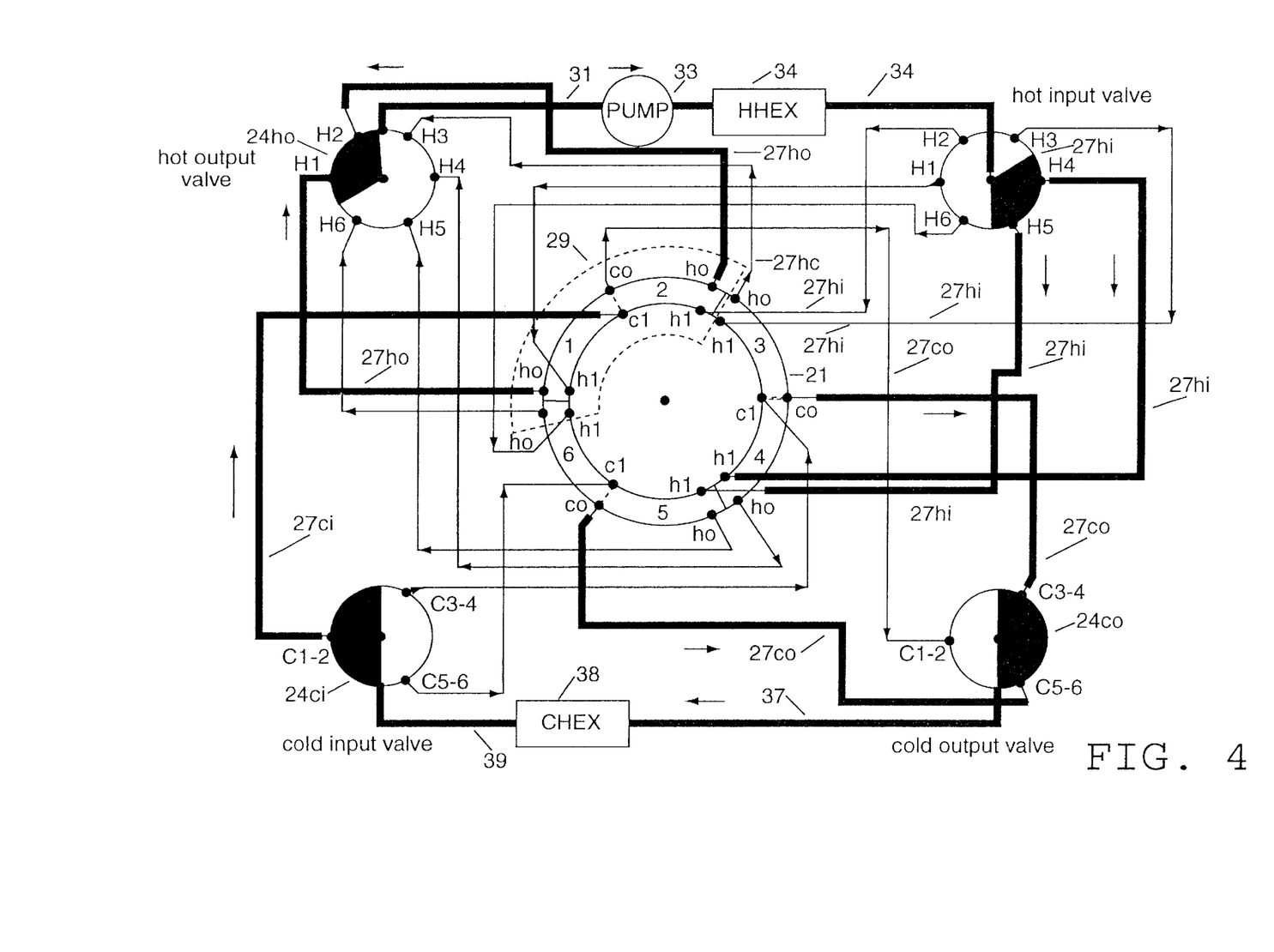
FIG. 4 is a schematic view as in FIG. 3 showing fluid flow with the ring of beds in a second, moved position.
Figure 5:
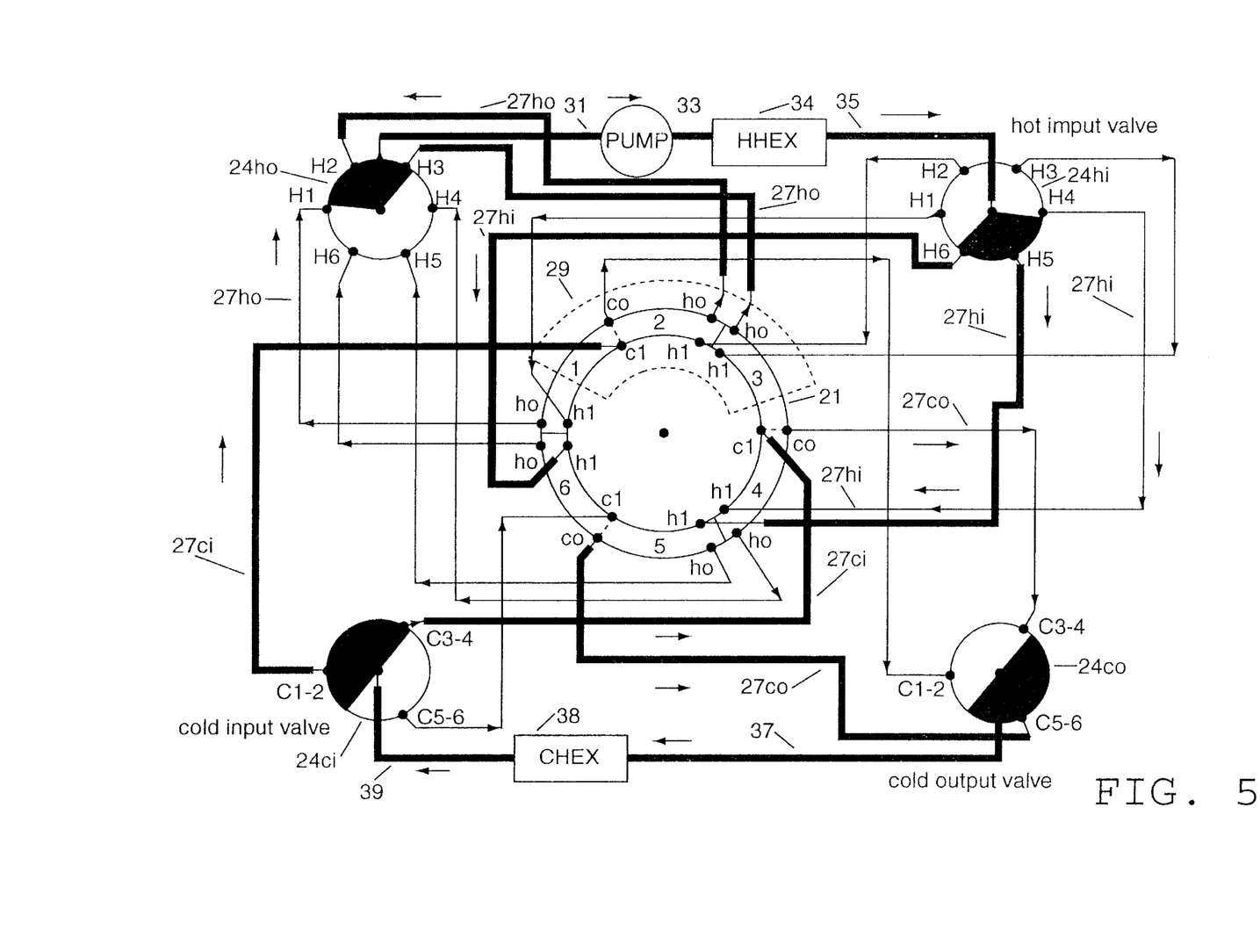
FIG. 5 is a schematic view as in FIG. 3 showing the fluid flow with the ring of beds in a further moved position.

FIGS. 3–5 illustrate the flow patterns through the rotating and stationary conduits, the rotary distribution valve 24, and the regenerator beds 22 as the bed ring 21 rotates. For purposes of illustration, the position of the magnet 29 is shown in dashed lines in various positions in these figures with respect to the ring 21, although it is understood that it is the ring that is moving counter-clockwise with respect to the magnet rather than the magnet moving clockwise with respect to the ring. In each of these figures, the conduits through which fluid is flowing are shown in heavy lines and the conduits in which fluid is not flowing are shown in light lines. Similarly, the connections within the valve 24 which permit fluid flow between conduits are illustrated by the dark shaded areas, whereas the light areas of the valve indicate that fluid flow to or from the conduits connected to such areas is blocked by the valve. There are four sections of the valve 24, which are designated 24ho, 24hi, 24ci, and 24co in FIGS. 3–5.

At the instant illustrated in FIG. 3, the entire bed 1 and most of the bed 6 are within the magnetic field of the magnet 29. The heat transfer fluid flows from the warm end of the heat exchanger 38 through the conduit 39, thence to a cold fluid chamber of the valve section 24ci, and thence on the two conduits 27ci that connect to the cold end input ports ci of bed 1 and of bed 6. The heat transfer fluid flows through the bed 1 circumferentially from the cold end of the bed to the hot end of the bed and exits from the hot end port ho into the conduit 27ho which leads back to a hot output valve section 24ho of the valve 24 at a port H1. The hot output chamber of the valve section 24ho into which the fluid flows also receives heat transfer fluid on a conduit 27ho from the hot output port ho of the bed 6, which is moving out of the magnetic field of the magnet 29. The warm heat transfer fluid from the lines 27ho, which is received by the hot output valve section 24ho, is then transferred to the (stationary) output conduit 31 and thence through the pump 33 to the hot heat exchanger 34 where heat is discharged from the fluid, cooling it. The cooled fluid then flows on the conduit 35 to a hot input valve section 24hi of the valve 24 where it is distributed into a hot fluid chamber shown in darkened section in FIG. 3. The cooled fluid flows out of the valve 24 into the two conduits 27hi which lead to the hot end input port hi of the bed 3 and the hot end input port hi of bed 4. The beds 3 and 4 are all outside of the magnetic field and thus are cool. The heat transfer fluid flows from the input ports hi at the hot end of these two beds through the magnetocaloric material in the beds to the cold ends of the beds where it exits through the output port co to the conduit 27co. The fluid then flows through the cold output valve section 24co to the stationary conduit 31 and thus to the cold heat exchanger 38.

FIG. 4 shows the flow patterns where the relative position of the magnet 29 with respect to the ring 21 has changed so that the magnetic field from the magnet 29 is fully over the beds 1 and 2, and bed 6 is out of the magnetic field. The valve section 24ho has moved so that it now blocks flow in the conduit 27ho leading from the output port ho of bed 6, and the valve section 24ci has moved so that it now blocks flow in the conduit 27ci leading to the cold end input port ci of the bed 6. Further, the valve section 24hi has moved to now block flow in the conduit 27hi leading to the input port hi of bed 3 so that no fluid is now flowing through the bed 3. Thus, the beds 3 and 6, which are not fully in or fully out of the magnetic field, have no flow through them, while beds 1 and 2, which are in the magnetic field, have fluid flowing through them which travels to the hot heat exchanger 34, and beds 4 and 5, which are fully out of the magnetic field (and thus at a lower temperature), have fluid flowing through them that travels to the cold heat exchanger 38.

FIG. 5 shows the further moved relative position of the ring 21 with respect to the magnet 29, in which entire bed 2 and most of bed 3 are in the magnetic field. The valve section 24ci has now moved to a position in which the conduits 27ci leading to the cold end input ports of the beds 2 and 3 supply fluid to those beds, and the valve section 24ho has moved to provide flow from the output ports ho of beds 2 and 3 through the conduit 27ho. The fluid flowing through the beds 2 and 3 thus flows through the valve section 24ho to the output conduit 31, the pump 33, and thence to the hot heat exchanger 34. The valve section 24hi has now moved to provide fluid flow on the conduit 27hi to the hot end input ports hi of beds 5 and 6 (which are now fully out of the magnetic field and thus cooled), and valve section 24co has moved to a position in which it provides flow on the conduit 2co from the cold end output port co of the beds 5 and 6 through the valve section 24co to the conduit 37 and thus to the cold heat exchanger 38.

The foregoing pattern of heat transfer fluid flow is repeated as the relative position of the bed ring 21 with respect to the magnetic field of the magnet 29 completes a full revolution of the ring 21. It is seen that the fluid flow through each of the beds is from the cold end to the hot end of the bed when the bed is within the magnetic field of the magnet 29, and the flow is from the hot end to the cold end of the bed when the bed is outside of the magnetic field. Thus, the temperature gradient in the magnetocaloric material within the beds will be maintained as the beds rotate in and out of the magnetic field. The direction of flow in each of the conduits 27 remains unidirectional, so that there is no back flow of heat transfer fluid at any time. In certain positions of the valve 24, in some of the conduits (as shown in the light lines in FIGS. 3–5) the heat transfer fluid will remain stationary (but will not reverse the direction of flow) until a later position of the valve 24.

Figure 6:
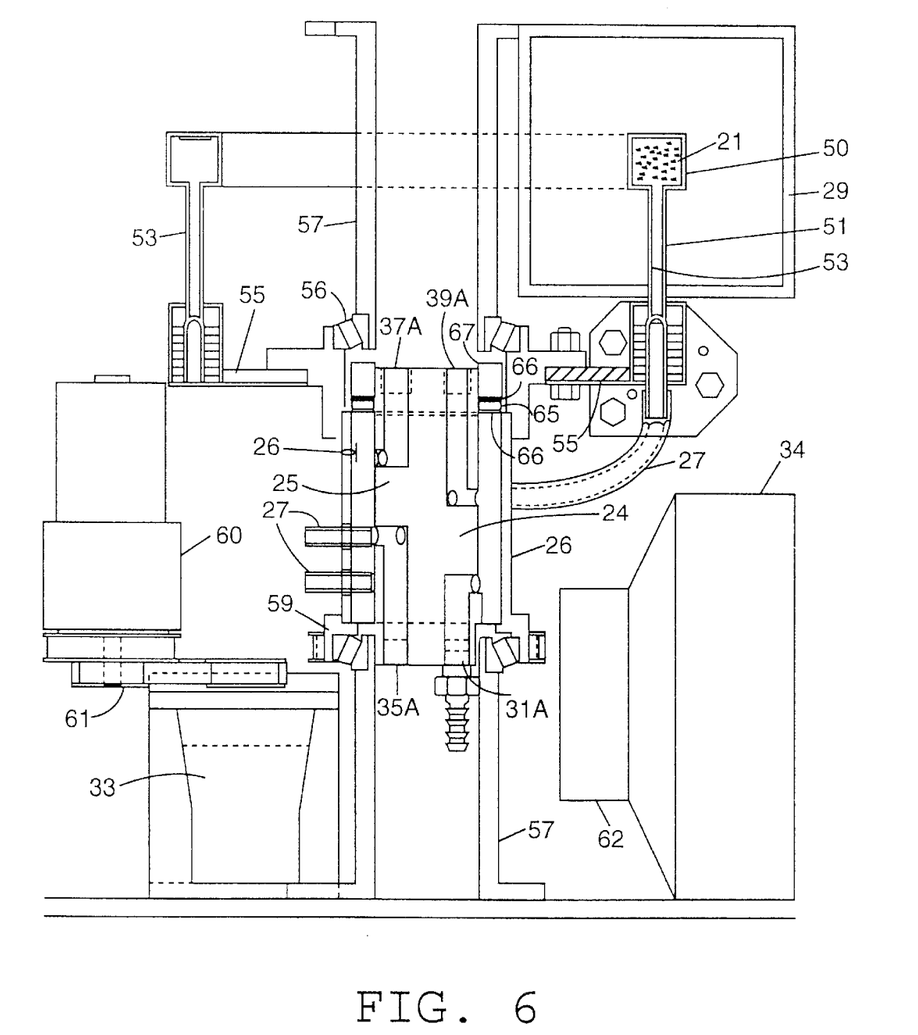
FIG. 6 is a partial cross-sectional view of a preferred implementation of a rotating bed magnetic refrigeration apparatus in accordance with the invention.

FIG. 6 illustrates an exemplary mechanical structure for implementation of the refrigeration apparatus 20. For exemplification, the magnet 29 may be formed with the ring 21 extending through an opening 50 in the middle of the magnet 29 at which the flux is concentrated. A slot 51 in the magnet 29 leading to the opening 50 permits passage therethrough of a support member 53 which also can be formed hollow to function as part of a conduit 27. The supports 53 extend to a mounting platform 55, which is mounted by a bearing 56 for rotation to a core 57. The conduits 27 extend to the rotating outer portion 26 of the distribution valve 24. The stationary portion 25 of the valve 24 is mounted to the core 57 while the rotating portion 26 is mounted for rotation by bearings 59 to the core 57. As illustrated in FIG. 6, the stationary conduits 31A, 35A, 37A and 39A are connected to the stationary valve member 25. A motor 60 is connected by gearing 61 to the pump 33 to drive the pump and is also connected to drive the mounting platform 55 and the rotating valve member 26 connected thereto in rotation. As illustrated in FIG. 6, the hot heat exchanger 34 may include a fan 62 connected to blow air through the heat exchange elements to enhance the efficiency of heat exchange.

Figure 7:
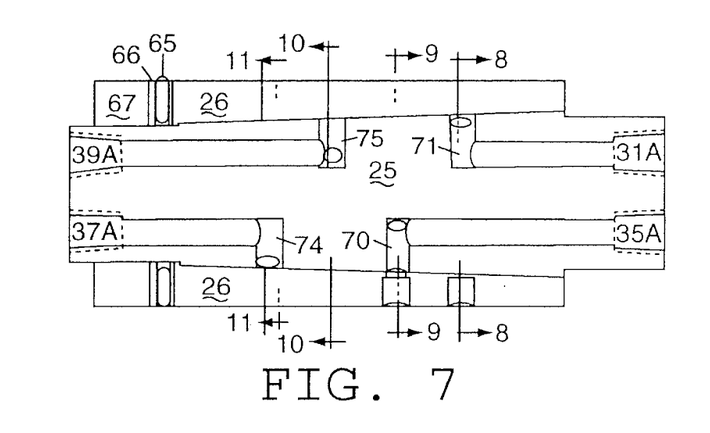
FIG. 7 is a cross-sectional view through the distribution valve of FIG. 6.
Figure 8:
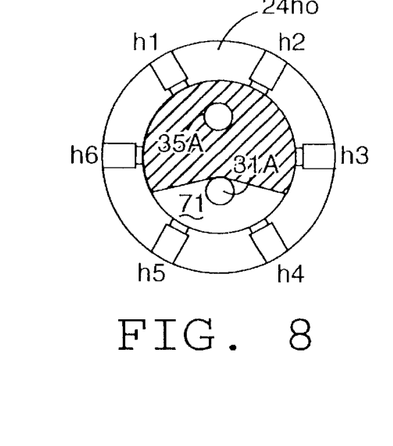
FIG. 8 is a cross-sectional view through the distribution valve taken generally along the lines 8—8 of FIG. 7.
Figure 9:
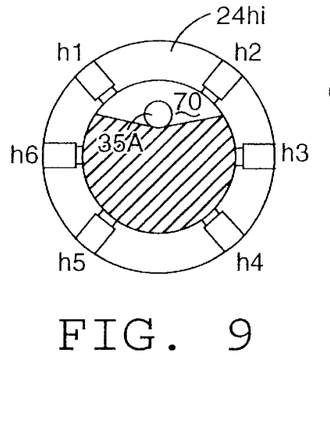
FIG. 9 is a cross-sectional view through the distribution valve taken generally along the lines 9—9 of FIG. 7.
Figure 10:
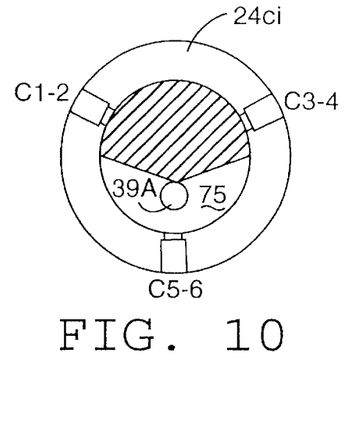
FIG. 10 is a cross-sectional view through the distribution valve taken generally along the lines 10—10 of FIG. 7.

FIG. 7 illustrates in more detail the axial cross section through the valve 24, and FIGS. 8–11 are cross-sections perpendicular to the axis at the levels of various sections 24*ho*, 24*hi*, 24*ci*, 24*co* of the valve. As illustrated in FIG. 7, the stationary portion 25 of the valve is preferably formed in a tapered shape and is received in an interior bore of the rotating valve section 26 which is also tapered to match the taper of the stationary member, allowing the rotating member 26 to fit snugly over the stationary member 25. A spring 65 applies pressure between the outer valve member 26 and stationary member 25 through bearings 66 with collar 67. The valve members 25 and 26 may be formed of a suitable material, such as various plastics, including the commercial products Nylatron GS and Teflon, which will provide a tight engagement between the inner and outer valve members to block fluid flow but with relatively low resistance and frictional loss as the outer valve member 26 rotates with respect to the stationary valve member 25.

Figure 11:
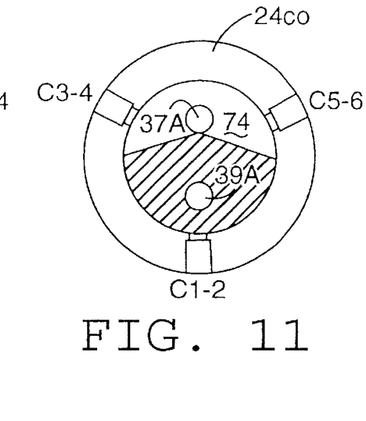
FIG. 11 is a cross-sectional view through the distribution valve taken generally along the lines 11—11 of FIG. 7.

The hot output valve section 24*ho* (FIG. 8) has a hot fluid chamber 71 formed therein which is in communication with a channel 31A formed in the stationary valve member which connects, via a hot fluid opening, to the conduit 31. The hot input valve section 24*hi* has a hot fluid chamber 70 formed therein to which a channel 35A, in the valve member 25, is in communication, via a hot fluid opening in the stationary valve section, to connect to the conduit 35 (FIG. 9. The cold input valve section 24*ci* has a cold fluid chamber 75 formed therein which is in communication with a channel 39A formed in the stationary valve member 25 that has a cold fluid opening to which the conduit 39 may be connected (FIG. 10), and the cold output valve section 24*co* has a cold fluid chamber 74 therein which is in communication with a channel 37A in the stationary valve member 25 that has a cold fluid opening to which the conduit 37 can be connected (FIG. 11). As shown in FIG. 6, the cold fluid openings face axially at one end (the top end as shown) of the valve, and the hot fluid openings face axially at the other end (the bottom end as shown).

As the outer valve member 26 rotates with respect to the inner stationary member 25, the six ports (H1–H6) in each of the valve sections 24*ho* and 24*hi*, which are connected to the conduits 27*hi* and 27*ho*, respectively, come into and out of communication with the hot fluid chambers 70 and 71. Similarly, as the valve rotates, the cold fluid ports C1–2, C3–4 and C5–6 in each of the valve sections 24*ci* and 24*co*, to which the conduits 27*ci* and 27*co*, respectively, are connected, come into communication with the cold fluid chambers 75 and 74, respectively.

The valve 24 may be split into multiple sections that accomplish the same functions as the combined valve already described. For example, heat leaks from hot to cold may be reduced by splitting the valve into a hot section that includes the functions of sections 24*ho* and 24*hi*, and a cold section that includes the functions of sections 24*co* and 24*ci*.

An alternate configuration for the valve 24 is a disk valve. The disk valve again serves two purposes. It transfers four separate unidirectional flow streams between the stationary and rotating portions of the apparatus. It also performs the switching function, directing the appropriate flow to/from the appropriate beds at the correct times.

Figure 12:
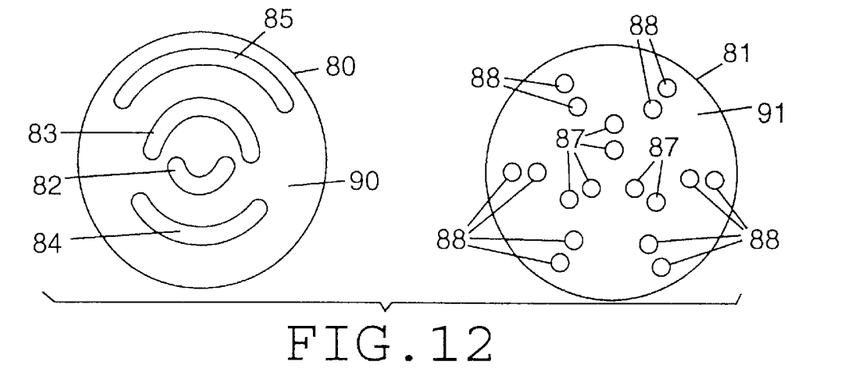
FIG. 12 is a view of disks that may be utilized in another distribution valve arrangement.

FIG. 12 illustrates an embodiment of a disk valve, which has two smooth, flat disks 80 and 81. The first disk 80 has ports formed as arc shaped slots 82, 83, 84 and 85 at different radii and is fixed to the stationary portion of the apparatus with its center axis coaxial with the apparatus rotation axis 23. Each of the slots corresponds to a separate flow to be transferred from/to the stationary portion to/from the rotating portion of the apparatus, and each slot port is connected to one of the conduits 31, 35, 37 and 39. In a preferred single magnet, six bed configuration, the slots 82 and 83 are opposite to each other and extend to 180 degrees in arc and carry the flow to/from the cold heat exchanger, and the slots 84 and 85 are opposite to each other and extend to 120 degrees in arc and carry the flow to/from the hot heat exchanger. The second disk 81 has sets of ports formed as circular openings 87, 88 at different radii that come into and out of communication with the port slots 82, 83, 84, 85 on the stationary disk 80 as the two disks rotate with respect to each other. The ports 87, 88 are connected to the rotating conduits 27. In a preferred single magnet, six bed configuration, the ports are evenly spaced around the circle, and the ports 87 are shifted 30 degrees with respect to the ports 88. The second disk 81 is attached to the rotating portion of the apparatus, again with its center axis coaxial with the apparatus rotating axis 23. The flat surface 90 of the disk 80 and the flat face 91 of the disk 81 mate and are tightly engaged to form a dynamic seal. The two disks 80 and 81 may be pressed together by a spring, as discussed below, to ensure the correct contact pressure and correct any misalignment.

Figure 15:
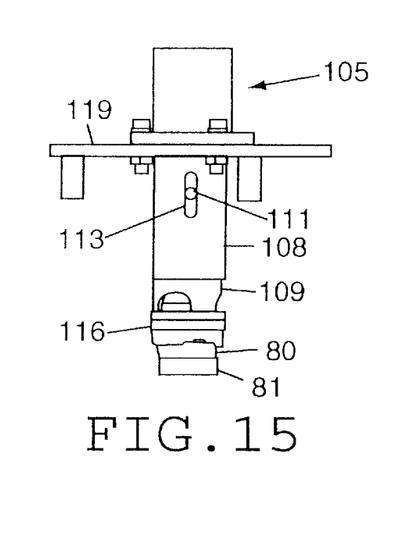
FIG. 15 is an elevation view of a mounting assembly for a distribution valve utilizing the disks of FIG. 12.
Figure 16:
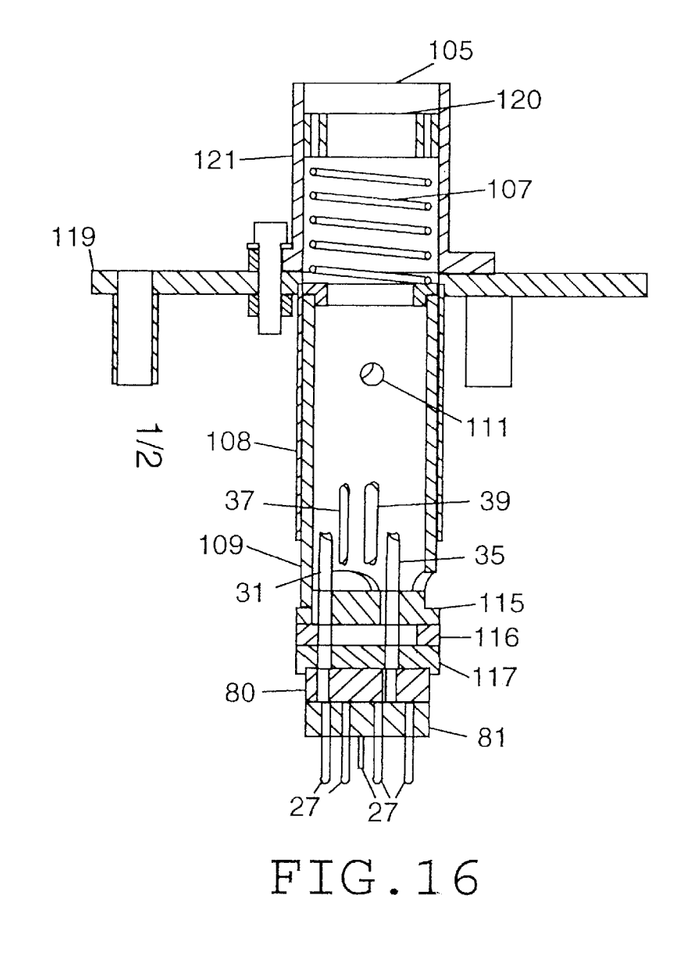
FIG. 16 is a cross-sectional view through the mounting assembly of FIG. 15.

FIGS. 15 and 16 illustrate a mounting assembly 105 for the stationary valve disk 80. The mounting assembly 105 applies a sealing force to hold the disks 80 and 81 against one another, prevents the stationary disk 80 from turning, and accommodates misalignment between the stationary and rotating disks 80 and 81. A coil spring 107 combined with telescoping tubes 108 and 109 force the stationary disk 80 against the rotating disk 81, resisting the internal fluid pressure that tends to separate the disks. A pin 111 that is fixed to the inner tube 109 and slides in an axially-oriented slot 113 in the outer tube 108 resists the frictional torque applied by the rotating disk and prevents the stationary disk 80 from turning. The disk 80 is mounted with a backing plate 115, an elastic element 116 (e.g., a rubber or plastic ring) and a valve seat 117, with the elastic element 116 serving to accommodate slight misalignment or "wobble" between the two disks, keeping the two matching surfaces completely in contact. Other implementations of a U-joint may also be used to accomplish the above purpose. Four fluid streams are brought in via conduits 31, 35, 37 and 39 passing through the inner tube and spring. The assembly 105 is secured to a mounting plate 119, and the spring 107 is held in a threaded tube 121 by a threaded adjuster 120. The rotating valve disk 81 is rigidly mounted to the rotating portion (not shown) of the apparatus.

Figure 13:
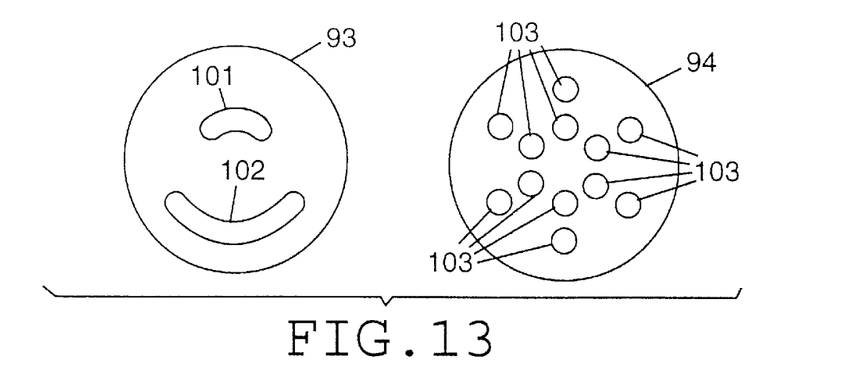
FIGS. 13 and 14 are views of alternative disks for use in a distribution valve.
Figure 14:
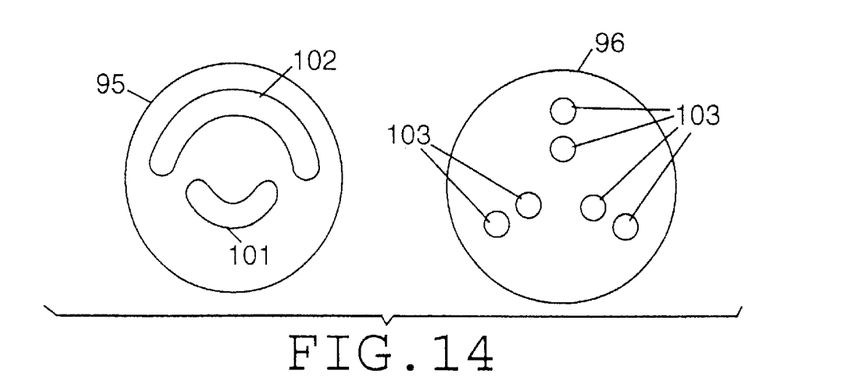

FIGS. 13 and 14 illustrate a variation where two separate disk valves are utilized composed of a pair of disks 93 and 94 and a pair of disks 95 and 96. The disks have port slots 101 and 102 and ports 103 which function in the same manner as discussed above with respect to the disks 80 and 81. The first disk valve pair 93 and 94 is placed at one axial end of the apparatus between the rotating and stationary portions, while the second valve pair 95 and 96 is placed at the opposite end between the rotating and stationary portions. All four individual disks are placed such that the rotation axis is normal to their surfaces and passes through their center so that the disks rotate coaxially with the apparatus rotation axis 23. Valve pairs 93, 94 and valve pairs 95, 96 each transfer two separate flow streams between the stationary and rotating portions of the apparatus. The advantage to using two separate disk valves is to allow thermal separation between hot and cold portions of the apparatus, and possible reduced manufacturing costs for the smaller flat disk face surfaces.

The disks 80, 81, 93, 94, 95, 96 may be made of various materials, including ceramic or carbon-graphite composite. The mating pairs need not be made of the same materials.

Figure 17:
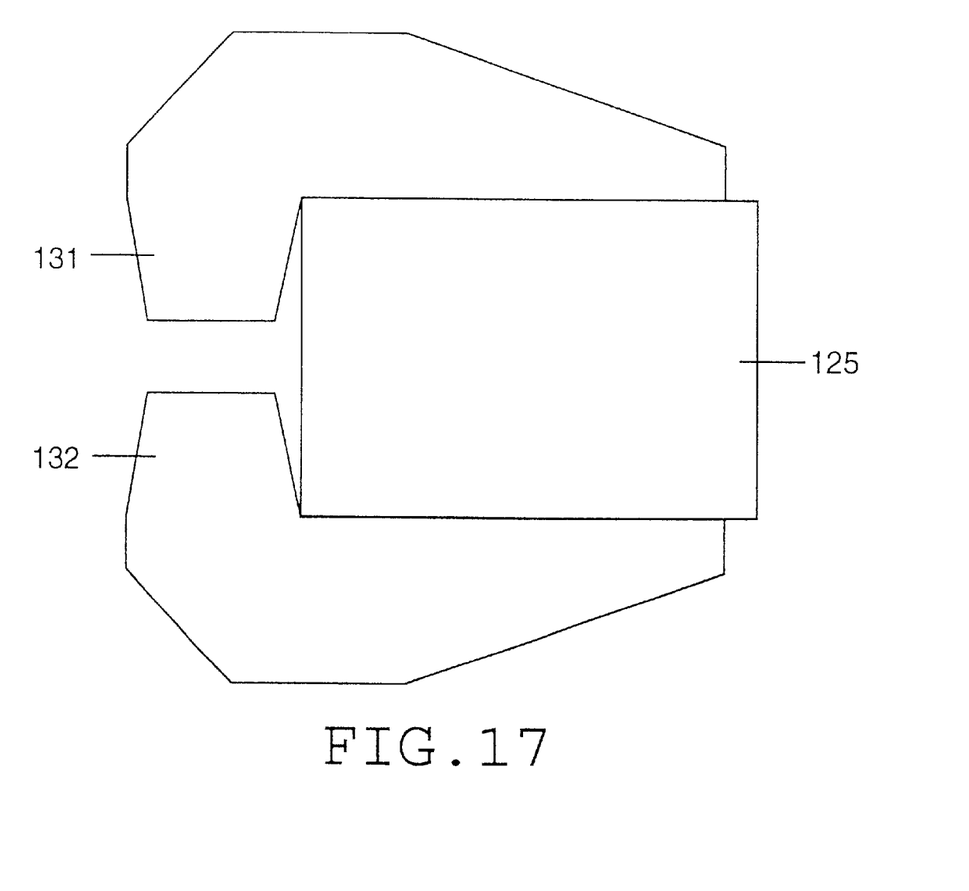
FIG. 17 is a cross-sectional view of preferred C-shaped magnet.

The particular magnetocaloric material chosen for filling the beds 22 will depend on the temperature range of operation of the apparatus and the magnetic field of the magnet 29. The material may be formed as small granules packed together which leaves interstices through which the heat transfer fluid can pass. For operation at or near room temperature, one type of suitable magnetocaloric material is gadolinium, and a suitable heat transfer fluid is water or water mixed with antifreeze. The construction of the beds, and the materials for the various components may be utilized as set forth in the aforesaid U.S. Pat. No. 5,934,078, the disclosure of which is incorporated herein by reference. Thermal insulation may be added to the bed wall, and in a preferred embodiment, rigid foam insulation forms the internal wall of the bed. The magnet 29 may comprise a permanent magnet such as a ring dipole magnet with a slot cut in the magnet. A magnet 29 with a C-shaped cross section with a permanent magnet piece 125 and two flux concentrating pole pieces 131 and 132 as shown in FIG. 17 may be utilized. In a preferred single magnet, six bed configuration, the magnet extends over an arc of 120 degrees. In addition, other types of magnets, including electromagnets and cryogenically cooled superconducting magnets, may also be utilized. Examples of these are described in the aforesaid U.S. Pat. No. 5,934,078 and in U.S. Pat. No. 5,249,424, the disclosure of which is also incorporated herein by reference.

It is understood that the invention is not confined to the particular embodiments set forth herein as illustrative, but embraces all such forms thereof as come within the scope of the following claims.

What is claimed is:

1. A method of providing regenerative cooling of a heat transfer fluid comprising the steps of:

(a) providing a ring of an even number of magnetic regenerator beds, each bed including material that exhibits the magnetocaloric effect, that is porous and allows the flow of heat transfer fluid through such magnetocaloric material, each bed having a hot end and a cold end, the beds arranged in a circular ring with the cold end of each bed adjacent to the cold end of an adjacent bed and the hot end of each bed adjacent to the hot end of an adjacent bed;

(b) rotating the ring of regenerator beds through a magnetic field to alternately apply a magnetic field to and remove the magnetic field from each of the regenerator beds as the ring of beds rotates;

(c) passing heat transfer fluid through a regenerator bed from the hot end of the bed to the cold end when the bed is not in the magnetic field so that the heat transfer fluid is in circumferential flow with respect to the central axis about which the bed is rotated, and passing heat transfer fluid through the regenerator bed from the cold end to the hot end of the bed in a circumferential flow when the ring of beds is rotated so that the bed is in the magnetic field.

2. The method of claim 1 including drawing heat from heat transfer fluid that has passed through the regenerator bed from the cold end to the hot end of the bed when the bed is in the magnetic field.

3. The method of claim 2 further including the step of transferring heat to heat transfer fluid that is then passed to and through a regenerator bed from the cold end to the hot end of the bed when the bed is in the magnetic field.

4. Rotating magnetic refrigeration-heat pump apparatus comprising:

(a) a ring of magnetic regenerator beds mounted for rotation about a central axis and a drive for driving the ring of magnetic regenerator beds in rotation about the central axis, each bed including material that exhibits the magnetocaloric effect that is porous and allows the flow of heat transfer fluid through such magnetocaloric material in circumferential flow, each bed having a hot end and a cold end;

(b) a magnet providing a magnetic field that passes through at least one but not all of the regenerator beds in the ring so that at least one bed is in the magnetic field and at least one bed is outside of the magnetic field;

(c) a hot heat exchanger;

(d) a cold heat exchanger;

(e) a distribution valve connected by conduits to the hot heat exchanger and to the cold heat exchanger and by conduits to the hot end and cold end of each magnetic regenerator bed, the distribution valve switching as the ring of regenerator beds rotates to direct heat transfer fluid in a circuit from a bed which is outside the magnetic field through the distribution valve to the cold heat exchanger and then back through the distribution valve to the bed that is in the magnetic field and then through the distribution valve to the hot heat exchanger and then back through the distribution valve to a bed that is outside the magnetic field, the distribution valve directing the flow therethrough so that the flow through the conduits is maintained in the same direction and with the direction of flow through each bed when the bed is outside the magnetic field reversed from the direction of flow when the bed is in the magnetic field; and (f) a pump connected in the conduits to drive heat transfer fluid through the hot and cold heat exchangers, the conduits, and the distribution valve.

5. The refrigerator apparatus of claim 4 wherein corresponding inlet and outlet conduits between the distribution valve and the beds are merged via a Y connector into a single inlet/outlet port at the beds.

6. The refrigeration apparatus of claim 4 wherein there are an even number of magnetic regenerator beds, the beds arranged in the circular ring with the cold end of each bed adjacent to the cold end of an adjacent bed and the hot end of each bed adjacent to the hot end of an adjacent bed, the adjacent cold ends of the beds open to each other for fluid flow and having one common cold end input port and one common cold end output port, the adjacent hot ends of the beds separated by flow proof separators and having an input and an output port for the hot end of each bed.

7. The refrigeration apparatus of claim 4 wherein the distribution valve includes a stationary valve member and a rotating valve member that is mounted to rotate in engagement with the stationary valve member about the central axis, and wherein conduits extend from the rotating valve member to the hot ends and cold ends of each bed to distribute fluid between the distribution valve and the beds, the rotating valve member rotating with the ring of regenerator beds.

8. The refrigeration apparatus of claim 7 wherein the distribution valve comprises an inner stationary valve member and an outer rotating valve member that is mounted to rotate in engagement with the stationary valve member about the central axis, the stationary valve member having two cold fluid chambers and two hot fluid chambers, the rotating valve member having first cold fluid ports therein that as the rotating valve member rotates are successively in communication with the first cold fluid chamber, second cold fluid ports therein that, as the rotating valve member rotates, are successively in communication with the second cold fluid chamber, the rotating valve member further having first hot fluid ports that, as the rotating valve member rotates, are successively in communication with the first hot fluid chamber, and second hot fluid ports that, as the rotating valve member rotates, are successively in communication with the second hot fluid chamber, and channels in the stationary valve member extending from two hot fluid openings to the first and second hot fluid chambers and from two cold fluid openings to the first and second cold fluid chambers, and wherein conduits extend from the cold input ports of the beds to the ports in the rotating valve member that come successively in communication with the first of the cold fluid chambers, conduits extend from the cold output ports of the beds to the ports in the rotating valve member that come successively in communication with the second of the cold fluid chambers, conduits extend from the hot output ports of the beds to the ports in the rotating valve member that come successively in communication with the first of the hot fluid chambers, and conduits extend from the hot input ports of the beds to the ports of the rotating valve member that come successively in communication with the second of the hot fluid chambers and, further, conduits extend from the outlet of the cold heat exchanger to a cold fluid opening of the stationary valve member that is in communication with the first cold fluid chamber, conduits extend from the inlet of the cold heat exchanger to a cold fluid opening of the stationary valve member that is in communication with the second cold fluid chamber, conduits extend from a hot fluid opening of the stationary valve member in communication with the first hot fluid chamber to the inlet of the hot heat exchanger through a pump, and conduits extend from the outlet of the hot heat exchanger to a hot fluid opening in the stationary valve member in communication with the second hot fluid chamber in the stationary valve member.

9. The refrigeration apparatus of claim 8 wherein the stationary valve member has a top end and a bottom end and wherein the cold fluid openings in the stationary valve member face axially at one of the ends and the hot fluid openings in the stationary valve member face axially at the other end.

10. The refrigeration apparatus of claim 7 wherein the magnet comprises a permanent magnet.

11. The refrigeration apparatus of claim of 10 wherein the magnet is C-shaped.

12. The refrigeration apparatus of claim 7 further including a mounting platform mounted for rotation about the central axis, the conduits that extend from the rotating valve member to the beds having sections extending from the mounting platform to the ring of beds, the ring of beds supported by the mounting platform for rotation about the central axis.

13. The refrigeration apparatus of claim 12 wherein the conduit sections extending from the mounting platform to the beds providing physical support for the ring of beds.

14. The refrigeration apparatus of claim 12 wherein the rotating valve member and the mounting platform are connected together to rotate together about the central axis.

15. The refrigeration apparatus of claim 7 wherein the stationary valve member and the rotating valve member are formed as disks with flat faces in engagement with one another, the rotating valve member mounted to rotate about the central axis with its face normal to the central axis, the stationary and rotating valve member having ports therein that come into and out of communication as the rotating valve member rotates.

16. The refrigeration apparatus of claim 15 including a spring mounting assembly mounting the stationary valve member disk into engagement with the rotating valve member disk.

17. Rotating magnetic refrigeration-heat pump apparatus comprising:

(a) an even number of magnetic regenerator beds, each bed including material that exhibits that magnetocaloric effect that is porous and allows the flow of heat transfer fluid through such magnetocaloric material, each bed having a hot end and a cold end, hot end input and output ports at the hot end of each bed, and cold end input and output ports at the cold end of each bed, the beds arranged in a circular ring with the cold end of each bed adjacent to the cold end of an adjacent bed and the hot end of each bed adjacent to the hot end of an adjacent bed, the adjacent cold ends of the beds open to each other for fluid flow and having one common cold end input port and one common cold end output port, the adjacent hot ends of the beds separated by flow-proof separators and having an input port and an output port for the hot end of each bed, the ring of magnetic regenerator beds mounted for rotation about a central axis and including a drive for driving the ring of beds in rotation about the central axis, wherein heat transfer fluid flowing from an input port to an output port of a bed flows circumferentially with respect to the central axis;

(b) at least one magnet providing a magnetic field that passes through at least one but not all of the regenerator beds in the ring so that at least one bed is in the magnetic field and at least one bed is outside of the magnetic field;

(c) a rotary distribution valve comprising an inner stationary valve member and an outer rotating valve member that is mounted to rotate in engagement with the stationary valve member about the central axis, the stationary valve member having two cold fluid chambers and two hot fluid chambers, the rotating valve member having first cold fluid ports therein that as the rotating valve member rotates are successively in communication with the first cold fluid chamber, second cold fluid ports therein that, as the rotating valve member rotates, are successively in communication with the second cold fluid chamber, the rotating valve member further having first hot fluid ports that, as the rotating valve member rotates, are successively in communication with the first hot fluid chamber, and second hot fluid ports that, as the rotating valve member rotates, are successively in communication with the second hot fluid chamber, and channels in the stationary valve member extending from two hot fluid openings to the first and second hot fluid chambers and from two cold fluid openings to the first and second cold fluid chambers;

(d) conduits extending from the cold input ports of the beds to the ports in the rotating valve member that come successively in communication with the first of the cold fluid chambers, and conduits extending from the cold output ports of the beds to the ports in the rotating valve member that come successively in communication with the second of the cold fluid chambers, conduits extending from the hot output ports of the beds to the ports in the rotating valve member that come successively in communication with the first of the hot fluid chambers, and conduits extending from the hot input ports of the beds to the ports of the rotating valve member that come successively in communication with the second of the hot fluid chambers;

(e) a hot heat-exchanger with an inlet and an outlet;

(f) a cold heat-exchanger with and inlet and an outlet;

(g) conduits extending from the outlet of the cold heat exchanger to a cold fluid opening of the stationary valve member that is in communication with the first cold fluid chamber, and conduits extending from the inlet of the cold heat exchanger to a cold fluid opening of the stationary valve member that is in communication with the second cold fluid chamber, and conduits extending from a hot fluid opening of the stationary valve member in communication with the first hot fluid chamber to the inlet of the hot heat exchanger via a pump, and conduits extending from the outlet of the hot heat exchanger to a hot fluid opening in the stationary valve member in communication with the second hot fluid chamber in the stationary valve member; and (h) a pump connected in the conduits to drive heat transfer fluid in a circuit through the hot and cold heat exchangers, the conduits, the beds and the distribution valve.

18. The refrigeration apparatus of claim 17 wherein the stationary valve member has a top end and a bottom end and wherein the cold fluid openings in the stationary valve member face axially at one of the ends and the hot fluid openings in the stationary valve member face axially at the other end.

19. The refrigeration apparatus of claim 17 wherein the magnet comprises a permanent magnet.

20. The refrigeration apparatus of claim of 19 wherein the magnet is C-shaped.

21. The refrigeration apparatus of claim 17 further including a mounting platform mounted for rotation about the central axis, the conduits that extend from the rotating valve member to the beds having sections extending from the mounting platform to the ring of beds, the ring of beds supported by the mounting platform for rotation about the central axis.

22. The refrigeration apparatus of claim 21 wherein the conduit sections extending from the mounting platform to the beds providing physical support for the ring of beds.

23. The refrigeration apparatus of claim 21 wherein the outer rotating valve member and the mounting platform are connected together to rotate together about the central axis.

* * * * *